(12) United States Patent
Nishida et al.

(10) Patent No.: US 10,787,208 B2
(45) Date of Patent: Sep. 29, 2020

(54) VEHICLE-BODY LOWER FACE STRUCTURE

(71) Applicant: MAZDA MOTOR CORPORATION, Hiroshima (JP)

(72) Inventors: Shuhei Nishida, Hiroshima (JP); Yoshiatsu Kuga, Hiroshima (JP); Masaru Chikita, Hiroshima (JP); Hiroyuki Takahashi, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 28 days.

(21) Appl. No.: 16/362,358

(22) Filed: Mar. 22, 2019

(65) Prior Publication Data

US 2019/0291524 A1    Sep. 26, 2019

(30) Foreign Application Priority Data

Mar. 23, 2018  (JP) .................................. 2018-056453
Mar. 23, 2018  (JP) .................................. 2018-056454

(51) Int. Cl.
 *B62D 35/02* (2006.01)
 *B60G 7/00* (2006.01)
(52) U.S. Cl.
 CPC ............. *B62D 35/02* (2013.01); *B60G 7/001* (2013.01); *B60G 2204/4308* (2013.01)
(58) Field of Classification Search
 CPC ....... B60G 7/001; B62D 35/007; B62D 35/02

USPC ............................................. 296/180.1, 180.2
See application file for complete search history.

(56) References Cited

U.S. PATENT DOCUMENTS

| | | | | |
|---|---|---|---|---|
| 9,227,475 | B2 * | 1/2016 | Ottinger | B60G 7/001 |
| 9,415,650 | B2 * | 8/2016 | Bromme | F16D 65/128 |
| 9,643,664 | B2 * | 5/2017 | Tesch | B62D 35/02 |
| 9,902,225 | B2 * | 2/2018 | Riegelsberger | B60G 7/001 |
| 2011/0309652 | A1 * | 12/2011 | Eichentopf | B62D 35/02 |
| | | | | 296/180.1 |

FOREIGN PATENT DOCUMENTS

| | | |
|---|---|---|
| JP | 2012-148647 A | 8/2012 |
| JP | 2017-039354 A | 2/2017 |

* cited by examiner

*Primary Examiner* — Jason S Daniels
(74) *Attorney, Agent, or Firm* — Studebaker & Brackett PC (57) ABSTRACT

A torsion beam type of rear suspension comprising a pair of right-and-left trailing arms and a torsion beam connecting the trailing arms is provided. A floor under cover for airflow straightening is attached to a portion of a vehicle body in front of the rear suspension so as to cover a vehicle-body lower face. A arm cover is attached to a lower portion of the trailing arm so as to cover a lower face of the trailing arm. The arm cover is provided with an arm-cover enlarged portion which is configured to protrude outwardly, in a vehicle width direction, from the trailing arm in a vehicle bottom-face view. The floor under cover is provided with a floor-under-cover enlarged portion such that a rear end portion of the floor under cover faces closely to a front edge of the arm-cover enlarged portion.

6 Claims, 7 Drawing Sheets

VEHICLE-BODY LOWER FACE STRUCTURE

BACKGROUND OF THE INVENTION

The present invention relates to a vehicle-body lower face structure, and specifically relates to the vehicle-body lower face structure in which a torsion beam type of rear suspension comprising a pair of right-and-left trailing arms and a torsion beam connecting the trailing arms is provided and a floor under cover for airflow straightening is attached to a portion of a vehicle body in front of the rear suspension so as to cover a vehicle-body lower face.

In general, the torsion beam type of rear suspension is known as a structure for suspending a pair of right-and-left rear wheels. This torsion beam type of rear suspension comprises a pair of right-and-left trailing arms which extend in a vehicle longitudinal direction and a torsion beam which extends in a vehicle width direction and connects the trailing arms.

Japanese Patent Laid-Open Publication No. 2012-148647 discloses a vehicle provided with the above-described torsion beam type of rear suspension, in which an arm cover is provided at a lower face of the above-described trailing arm for the purpose of airflow straightening where an airflow of traveling air flowing below a vehicle floor which flows from below the vehicle floor toward an outward side of the rear wheel is deflected so as to flow straightly rearwardly in the vehicle longitudinal direction.

It has been found that in a case where there are provided the above-described arm cover and a floor under cover for airflow straightening which is provided at a portion of a vehicle body in front of the above-described rear suspension so as to cover a vehicle-body lower face for a high-speed airflow below the vehicle floor, the traveling air flowing below the vehicle floor flows through a gap formed among an inward edge of a rear wheel tire, a rear end portion of the floor under cover, and a front end portion of the arm cover, and then this traveling air having passed through the above-described gap flows upwardly and into a rear wheel house finally.

Meanwhile, Japanese Patent Laid-Open Publication No. 2017-39354 discloses a structure which comprises the torsion beam type of rear suspension and a rear under cover for airflow straightening which is provided at a rear vehicle-body lower face.

The above-described patent documents, however, do not refer to anything about the above-described traveling air flowing below the vehicle floor having passed through the gap formed among the inward edge of the rear wheel tire, the rear end portion of the floor under cover, and the front end portion of the arm cover which flows upwardly and into the rear wheel house.

SUMMARY OF THE INVENTION

Accordingly, an object of the present invention is to provide a vehicle-body lower face structure which can properly suppress the traveling air flowing below the vehicle floor from flowing into the rear wheel house, passing through the gap formed among the inward edge of the rear wheel tire, the rear end portion of the floor under cover, and the front end portion of the arm cover, thereby suppressing disturbance of a vehicle rear airflow properly.

The present invention is a vehicle-body lower face structure, comprising a torsion beam type of rear suspension comprising a pair of right-and-left trailing arms and a torsion beam connecting the trailing arms, a floor under cover for airflow straightening attached to a portion of a vehicle body in front of the rear suspension so as to cover a vehicle-body lower face, and a plate-shaped arm cover for airflow straightening attached to a lower portion of each of the trailing arms of the rear suspension so as to cover a lower face of the trailing arm, wherein the arm cover is provided with an arm-cover enlarged portion which is configured to protrude outwardly, in a vehicle width direction, from the trailing arm in a vehicle bottom-face view, and the floor under cover is provided with a floor-under-cover enlarged portion such that a rear end portion of the floor under cover which is positioned in front of the arm cover faces closely to a front edge of the arm-cover enlarged portion of the arm cover.

According to the present invention, a gap through which the position below the vehicle floor and an inside of the rear wheel house are connected (i.e., the gap formed among the inward edge of the rear wheel tire, the rear end portion of the floor under cover, and the front end portion of the arm cover) is so reduced by the enlarged portion of the arm cover and the enlarged portion of the floor under cover that the traveling air flowing below the vehicle floor can be properly suppressed from flowing into the rear wheel house, thereby suppressing the disturbance of the vehicle rear airflow properly.

Further, in a case where the above-described arm-cover enlarged portion is configured such that the outward-side edge, in the vehicle width direction, thereof is extended into a rim of the rear wheel in the vehicle bottom-face view, suppressing of the traveling air flowing below the vehicle floor from flowing into the rear wheel house by means of the arm-cover enlarged portion can be more effective.

In an embodiment of the present invention, a rear-end side of the floor under cover and a front-end side of the arm cover are configured to face closely to each other in a vehicle longitudinal direction, and an outward edge, in the vehicle width direction, of the floor-under-cover enlarged portion and an outward-side edge, in the vehicle width direction, of the arm-cover enlarged portion are configured to go around an inward-side face of a front portion of a tire of a rear wheel in a curved shape, being spaced apart from the rear wheel tire, and be continuous to each other in the vehicle longitudinal direction.

According to this embodiment, since only the necessary gap exists among the inward edge of the rear wheel tire, the rear end portion of the floor under cover, and the front end portion of the arm cover, it can be prevented that the airflow passing the floor under cover flows upwardly and into the rear wheel house, so that this airflow flowing into the rear wheel house can be suppressed more securely.

In another embodiment of the present invention, the arm-cover enlarged portion is configured as a cantilever structure such that the arm-cover enlarged portion protrudes toward the rim of the rear wheel beyond an outward end portion, in the vehicle width direction, of said trailing arm, and a vertical wall portion which extends upwardly is provided at least at the outward-side edge, in the vehicle width direction, of the arm-cover enlarged portion of the arm cover.

According to this embodiment, the strength of the arm cover can be effectively increased by the vertical wall portion even if the arm-cover enlarged portion of the arm cover is configured as the cantilever structure.

Other features, aspects, and advantages of the present invention will become apparent from the following description which refers to the accompanying drawings.

DETAILED DESCRIPTION OF THE INVENTION

Figure 2:
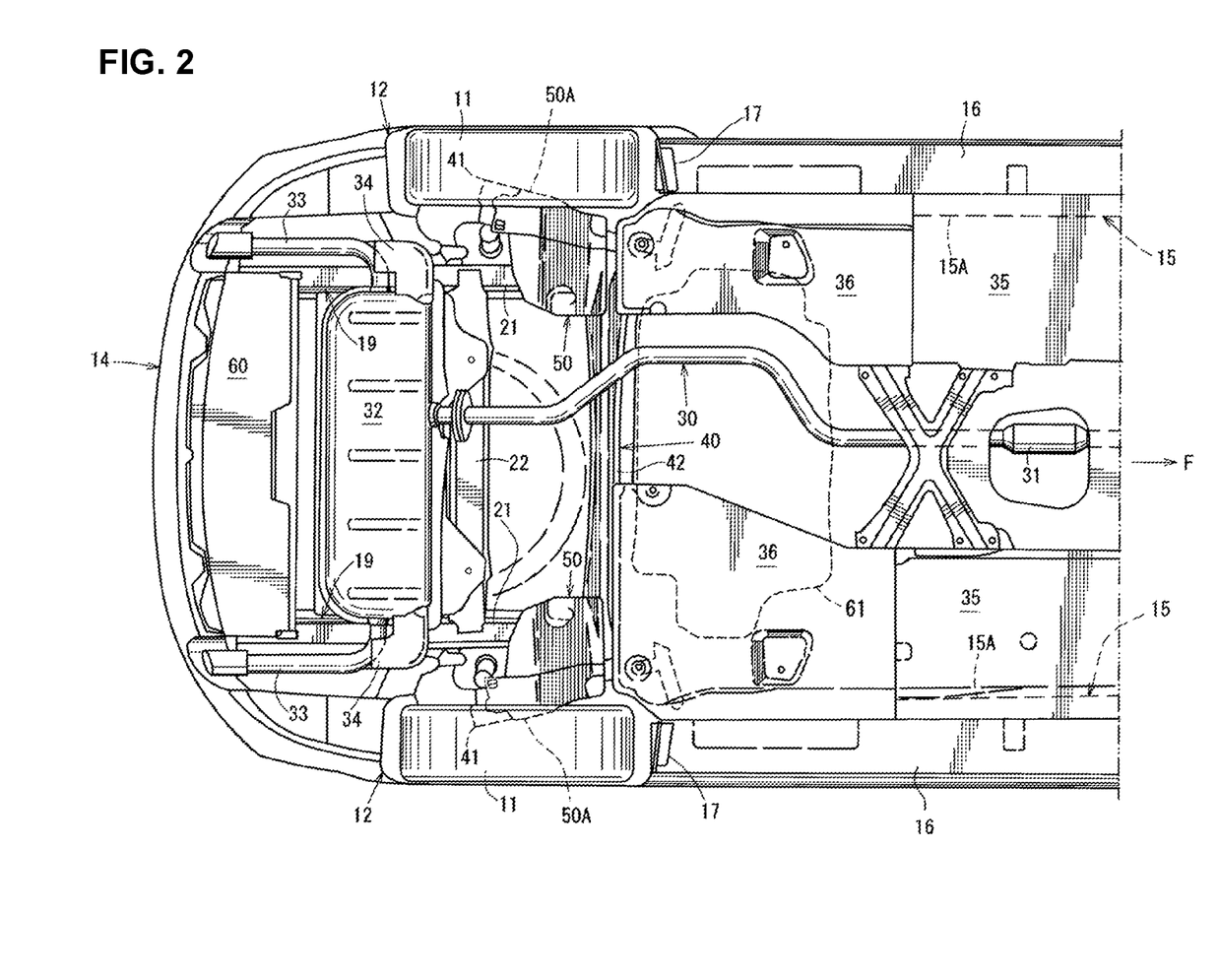
FIG. 2 is a bottom-face view of a major part of FIG. 1.
Figure 3:
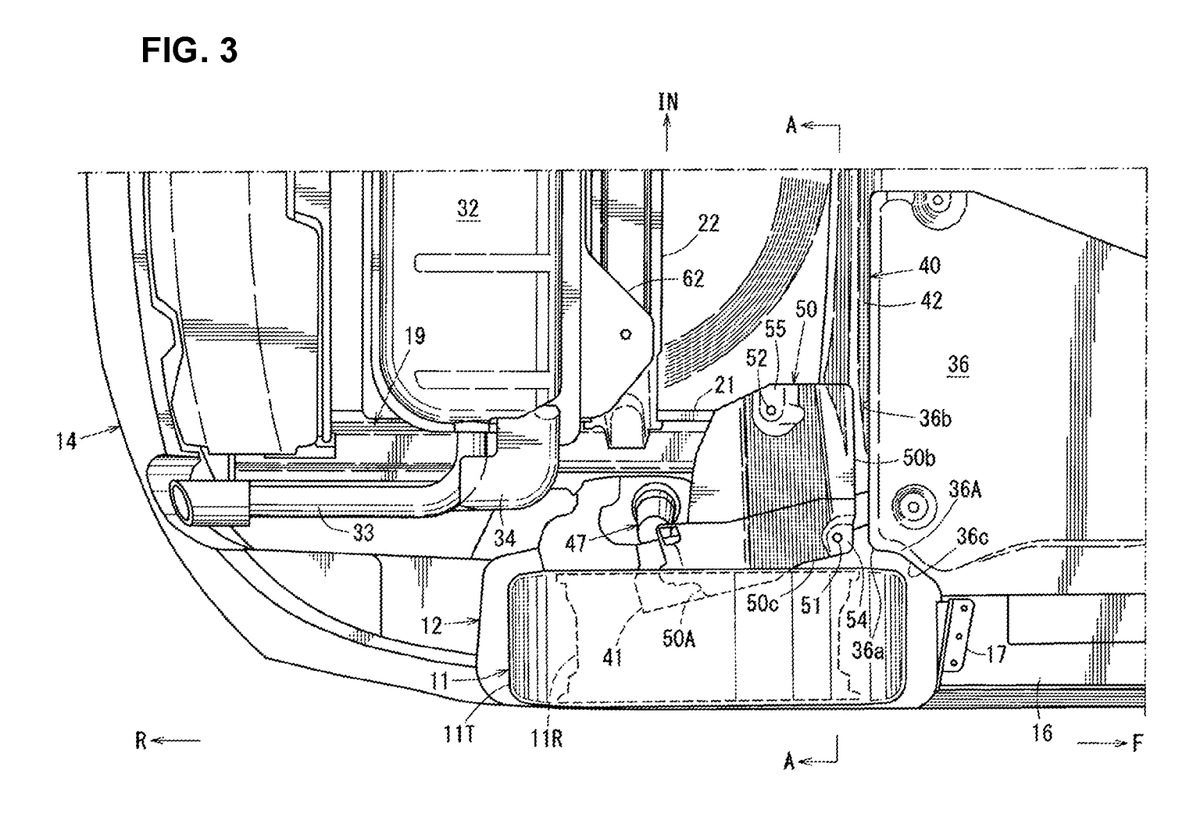
FIG. 3 is an enlarged view of a vehicle left-side part of FIG. 2.
Figure 4:
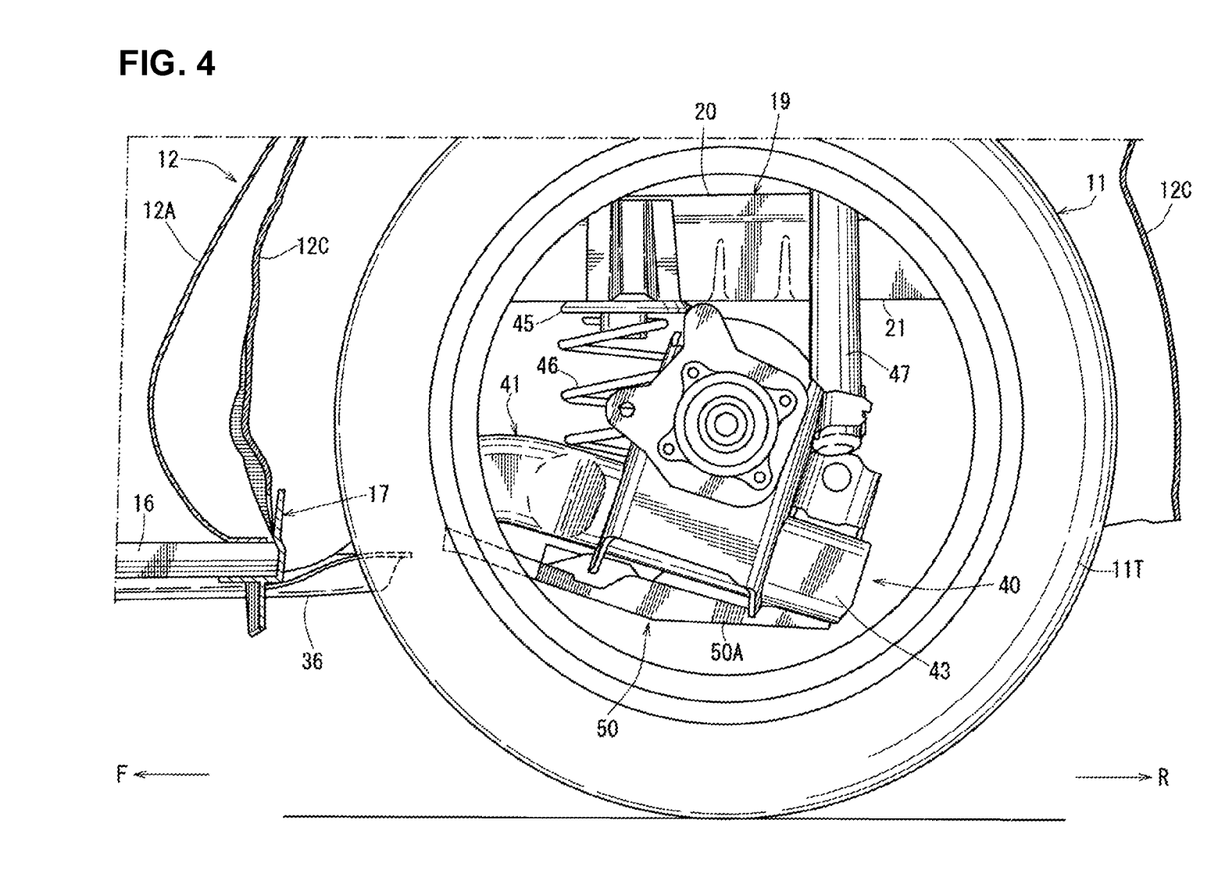
FIG. 4 is a side view showing a related structure of a floor under cover and an arm cover.
Figure 5:
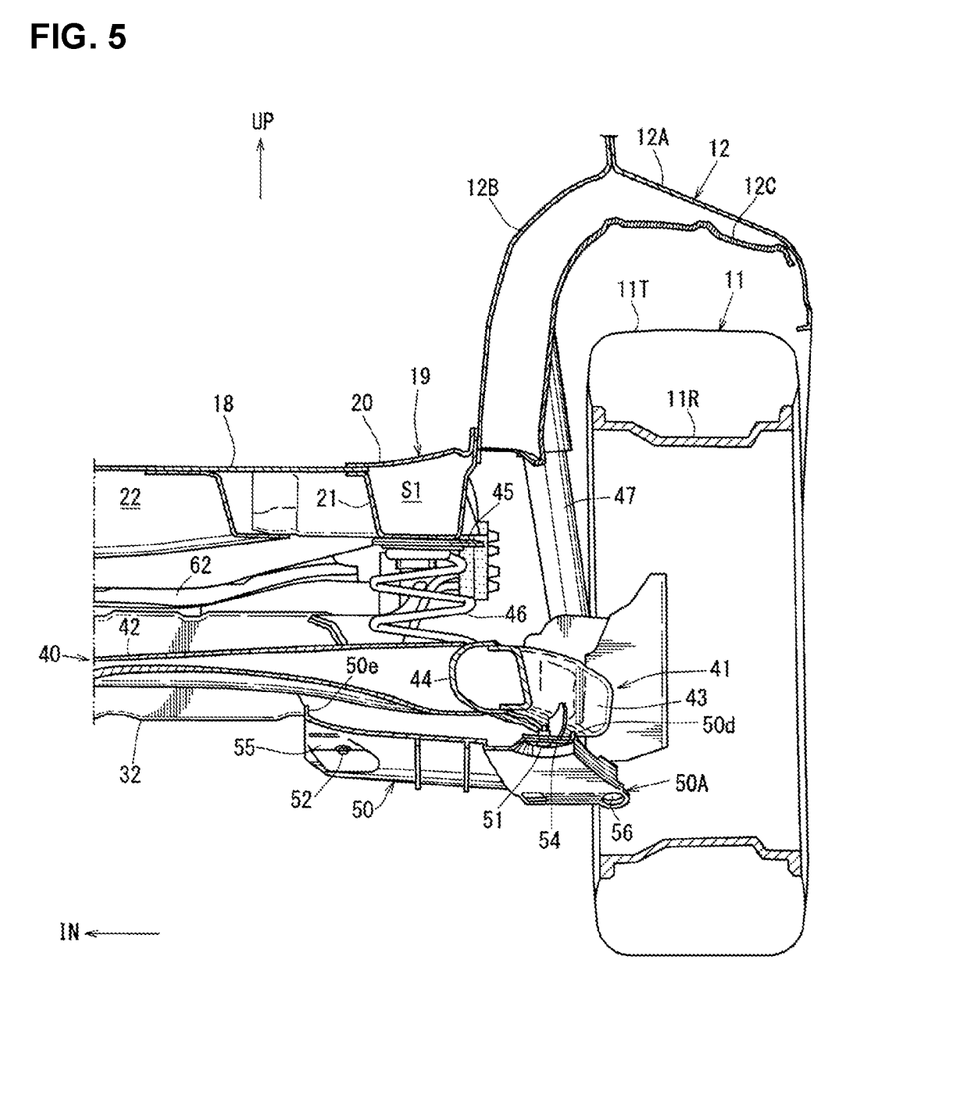
FIG. 5 is a sectional view taken along line A-A of FIG. 3.
Figure 6:
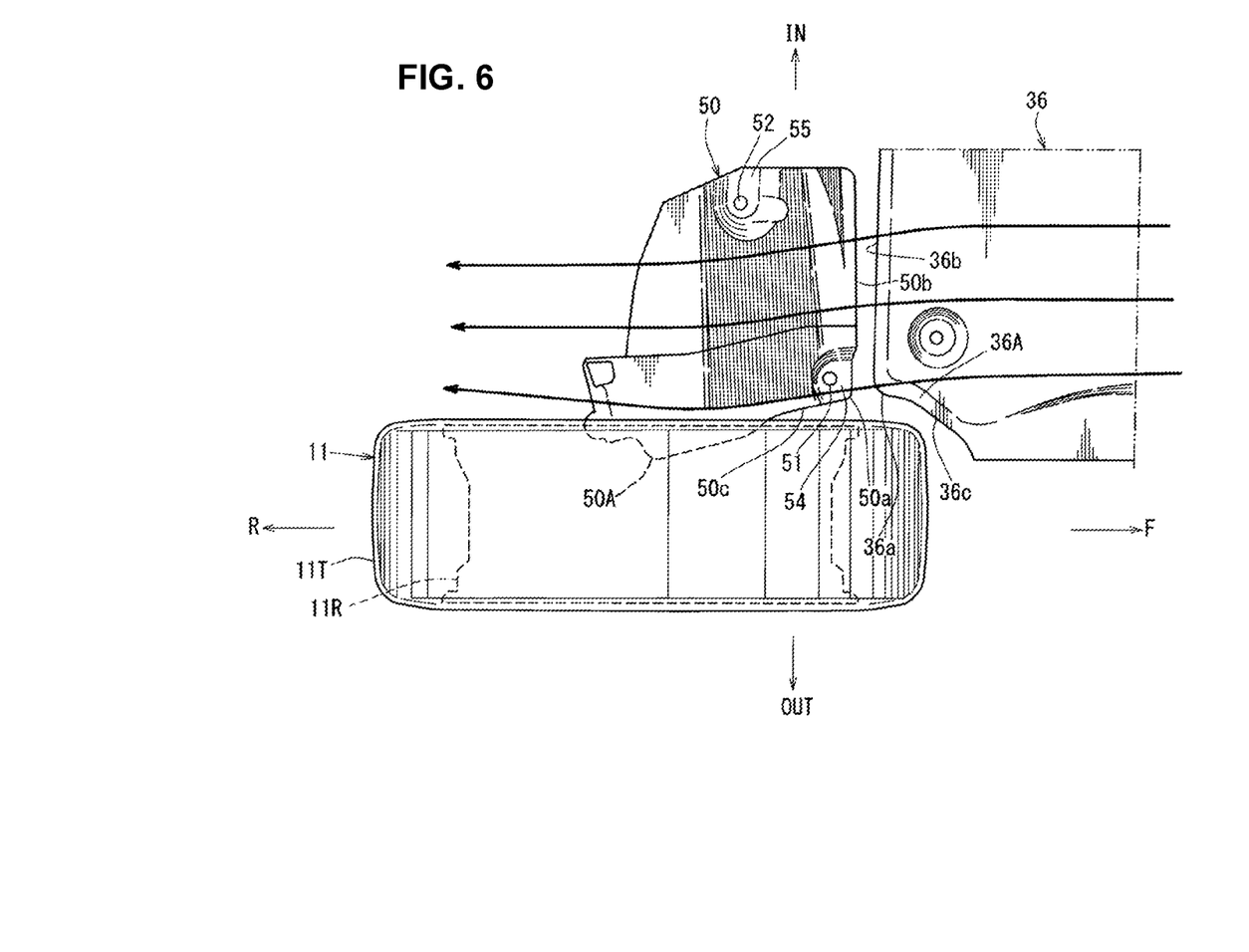
FIG. 6 is a major-part enlarged bottom-face view showing an airflow of traveling air flowing below a vehicle floor of the present embodiment.
Figure 7A:
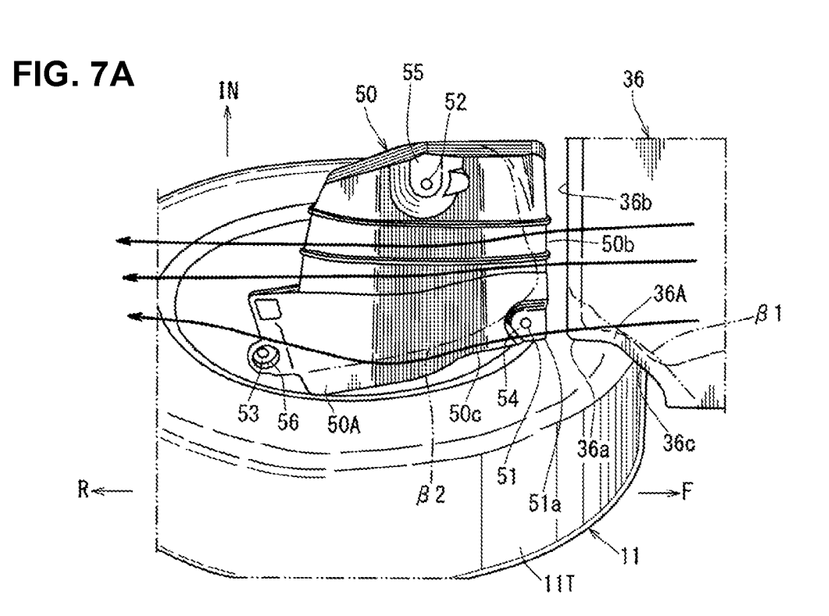
FIG. 7A is a bottom-face perspective view showing an airflow of traveling air flowing below a vehicle floor of the present embodiment.
Figure 7B:
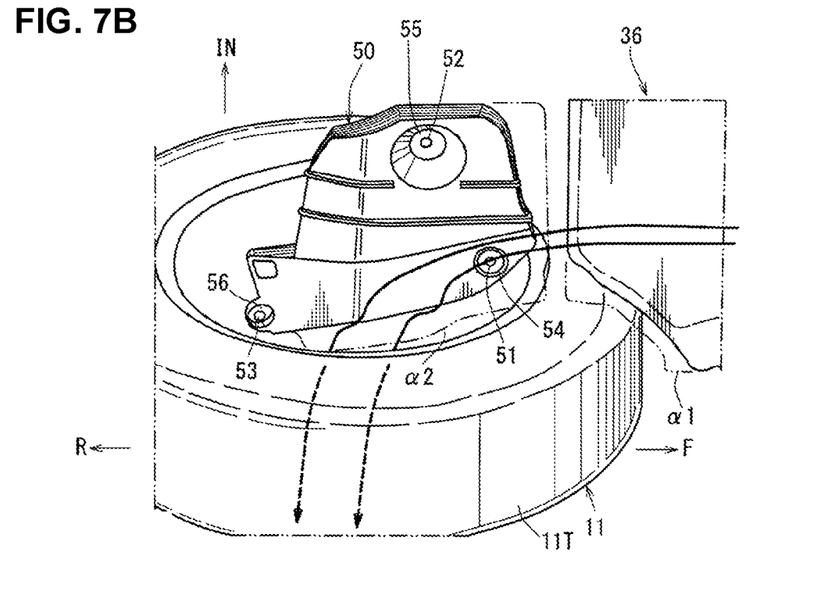
FIG. 7B is a bottom-face perspective view showing an airflow of the traveling air flowing below the vehicle floor of an comparative example.

Hereafter, an embodiment of the present invention will be specifically described referring to the drawings. The drawings show a vehicle-body lower face structure, and FIG. 1 is a side view of a vehicle which is provided with the vehicle-body lower face structure, FIG. 2 is a bottom view of a major part of FIG. 1, FIG. 3 is an enlarged view of a vehicle left-side part of FIG. 2, FIG. 4 is a side view showing a related structure of a floor under cover and an arm cover, FIG. 5 is a sectional view taken along line A-A of FIG. 3, FIG. 6 is a major-part enlarged bottom-face view showing an airflow of traveling air flowing below a vehicle floor of the present embodiment, FIG. 7A is a bottom-face perspective view showing an airflow of traveling air flowing below a vehicle floor of the present embodiment, and FIG. 7B is a bottom-face perspective view showing an airflow of the traveling air flowing below the vehicle floor of an comparative example.

Figure 1:
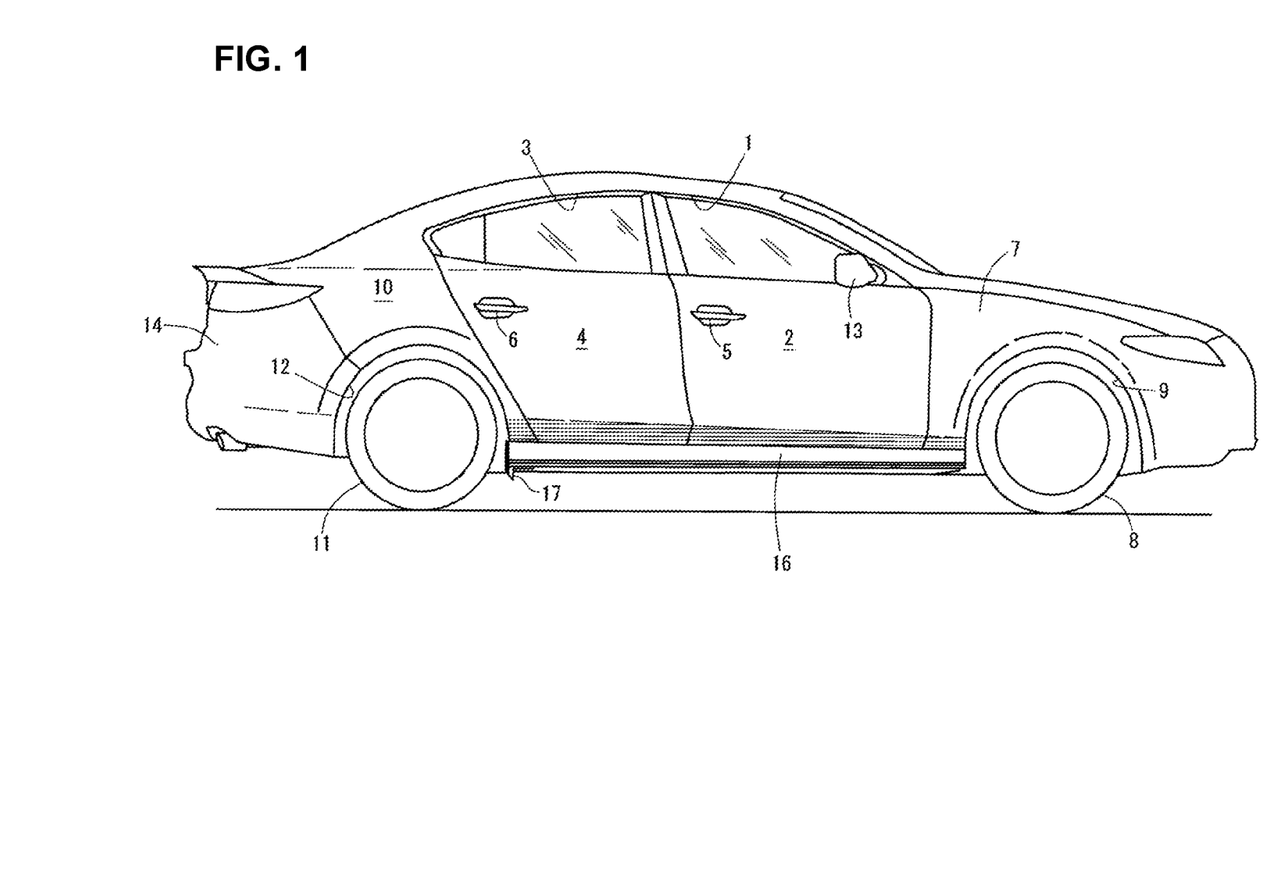
FIG. 1 is a side view of a vehicle which is provided with a vehicle-body lower face structure of the present invention.

As shown in FIG. 1, at a side portion of a vehicle body are provided a front door 2 as a side door which is configured to open or close a front door opening 1 which is formed at a vehicle front portion and a rear door 4 as another side door which is configured to open or close a rear door opening 3 which is formed at a vehicle rear portion. The front door 2 is equipped with a door outer handle 5, and the rear door 4 is equipped with another door outer handle 6 similarly.

As shown in FIG. 1, a front fender panel 7 which covers a side of an engine room is provided in front of the front door 2, and a front wheel house 9 is integrally formed at a lower portion of the front fender panel 7 at a position corresponding to a front wheel 8.

As shown in FIG. 1, a rear fender panel 10 which covers a side of a baggage compartment is provided in back of the rear door 4, and a rear wheel house 12 is integrally formed at a lower portion of the rear fender panel 10 at a position corresponding to a rear wheel 11. In FIG. 1, reference character 13 denotes a door mirror, and reference character 14 denotes a rear bumper face which is configured to extend rearwardly, going around a vehicle side portion.

As shown in FIG. 2, a pair of right-and-left side sills 15 which extend in a vehicle longitudinal direction at a lower portion of a cabin at a position between a lower end portion of a rear edge of the front wheel house 9 and a lower end portion of a front edge of the rear wheel house 12 are provided. The side sill 15 is a vehicle-body reinforcing member having a side-sill closed cross section, which is formed by fixedly joining a side sill outer and a side sill inner 15a (see FIG. 3) and extends in the vehicle longitudinal direction.

As shown in FIG. 2, a pair of garnishes 16, 16 are attached to the above-described pair of right-and-left side sills 15 such that each garnish 16 covers each side sill 15 over a range from the front wheel house 9 to the rear wheel house 12.

A tire deflector 17 is provided at a rear end portion of the garnish 16 such that the tire deflector 17 faces a front portion of the rear wheel 11 inside the rear wheel house 12. This tire deflector 17 is configured to deflect a side-face airflow flowing at a vehicle-body side portion such that the side-face airflow is turned toward an outward side, in the vehicle width direction, so as not to flow into the rear wheel house 12 and adheres to an outer face of a tire wheel of the rear wheel 12.

Herein, as shown in FIG. 5, the above-described rear wheel house 12 is formed by fixedly joining a wheel house outer 12A and a wheel house inner 12B, and a wheel-house mudguard 12C is provided at a face of the rear wheel house 12 which faces the rear wheel 11.

As shown in FIG. 5, a floor panel 18 which forms respective bottom faces of a cabin and a baggage compartment comprises a front floor panel, a rear seat pan, and a rear floor panel including a baggage-room recess portion, which are configured to be continuous in the vehicle longitudinal direction.

As shown in FIG. 2, the side sill 15 which extends in the vehicle longitudinal direction from the above-described front floor panel to a middle position, in a longitudinal direction, of the rear seat pan is fixedly joined to a side portion, in the vehicle width direction, of the floor panel 18.

As shown in FIGS. 2 and 5, a rear side frame 19 which extends in the vehicle longitudinal direction from a middle position, in a longitudinal direction, of the above-described rear seat pan to a rear end of the rear floor panel is provided. As shown in FIG. 5, the rear side frame 19 comprises a rear side frame upper 20 and a rear side frame lower 21, and a rear-side-frame closed cross section S1 which extends in the vehicle longitudinal direction is formed between the rear side frame upper 20 and the rear side frame lower 21.

As shown in FIG. 2, a rea cross member 22 which extends in the vehicle width direction is provided to be laid between the right-and-left rear side frames 19, 19 at a longitudinal position in back of a central portion of the rear wheel 11, and the right-and-left rear side frame lowers 21, 21 are interconnected by this rear cross member 22.

Meanwhile, as shown in FIG. 2, an exhaust pipe 30 to guide rearwardly exhaust gas which is discharged from exhaust ports and an exhaust manifold of an engine (a so-called exhaust pipe) is provided at a tunnel portion below the vehicle floor. This exhaust pipe 30 is provided with a catalyst convertor 31, a silencer 32 is connected to a rear end portion of the exhaust pipe 30 which extends to a position behind the rear cross member 22, and a pair of tail pipes 33, 33 are attached to right-and-left both sides of the silencer 32. This tail pipe 33 is configured in an L shape such that it extends outwardly in the vehicle width direction and then extends rearwardly. A cover for airflow straightening 34 is provided to cover between an outward side, in the vehicle width direction, of a front portion of the silencer 32 and a corner portion of the tail pipe 33 from below.

As shown in FIG. 2, a pair of right-and-left floor under covers for airflow straightening 35, 36 which cover another portion of the vehicle-body lower face than the tunnel portion are provided. Each of the floor under covers 35, 36 has a flat airflow-straightening face at its bottom face. The front-and-rear floor under covers 35, 36 are configured to be continuous to each other in the vehicle longitudinal direction.

As shown in FIG. 2, a torsion beam type of rear suspension 40 which suspends a pair of right-and-left rear wheels 11 is provided. The rear suspension 40 comprises a pair of right-and-left trailing arms 41, 41 extending in the vehicle longitudinal direction and a torsion beam 42 (torsional bar spring) which extends in the vehicle width direction and interconnects the trailing arms 41, 41.

As shown in FIG. 5, the torsion beam 42 is configured to have a hollow closed cross section. Further, as shown in the same figure, the trailing arm 41 is configured to have a closed cross section by fixedly joining a trailing arm outer 43 and a trailing arm inner 44.

A coil spring 46 as a suspension spring is provided to extend between a lower spring seat (not illustrated) which is fixedly joined to an inward side, in the vehicle width direction, of the trailing arm 41 and a rear face portion of the torsion beam 42 and an upper spring seat 45 which fixedly attached to a lower face of the rear side frame lower 21 of the rear side frame 19.

Further, as shown in FIGS. 4 and 5, a damper 47 is provided to extend between a rear-end-side upper portion of the trailing arm 41 and a vehicle-body side (a damper attachment portion of an upper portion of a wheel arch of the rear wheel house 12).

Also, as shown in FIGS. 2 and 3, a plate-shaped arm cover for airflow straightening 50 which covers a lower face of the trailing arm 41 is attached to a lower portion of the training arm 41. Herein, the above-described floor under covers 35, 36 are covers for airflow straightening which are provided to cover respective vehicle-body lower faces positioned in front of the rear suspension 40.

As shown in FIGS. 5, 6 and 7A, the arm cover 50 is attached to a lower face of the trailing arm 41 or a lower face of the lower spring seat by using attaching members, such as bolts 51, 52, 53, and a bracket such that the arm cover 50 moves together with the trailing arm 41.

The above-described bolt 51 is positioned at the outward side, in the vehicle width direction, of a front portion of the arm cover 50, the above-described bolt 52 is positioned at the inward side, in the vehicle width direction, of a middle portion, in the vehicle longitudinal direction, of the arm cover 50, and the above-described bolt 53 is positioned at the outward side, in the vehicle width direction, of a rear portion of the arm cover 50.

As shown in FIGS. 6 and 7A, in a case where the bolts 51, 52, 53 are used as the attaching member, these bolts 51, 52, 53 are disposed at recess portions 54, 55, 56 which are configured to be concaved upwardly such that respective head portions of the bolts 54, 55, 56 do not protrude downwardly from the lower face of the arm cover, i.e., from an airflow-straightening face. Meanwhile, the rear wheel 11 comprises a rim 11R and a tire 11T as shown in FIG. 5.

As shown in FIGS. 3, 6 and 7A, the arm cover 50 is provided with an arm-cover enlarged portion 50A which is configured such that an outward edge, in the vehicle width direction, of the arm cover 50 is extended (protrudes) into the rim 11R of the rear wheel 11.

As shown in FIG. 6, the arm-cover enlarged portion 50A protrudes into the rim 11R up to a position of about 18-20% of a rim width in the present embodiment, but this protrusion magnitude is not limited to this range.

According to this structure, as shown in FIG. 7A, it is prevented (blocked) by the above-described arm cover 50 that the traveling air flowing below the vehicle floor (see a bold arrow shown in the same figure) flows upwardly and into the rear wheel house 12, and also the airflow which flows rearwardly along the arm cover 50 after adhering to the arm cover 50 is suppressed by the above-described arm-cover enlarged portion 50A from flowing upwardly and into the rear wheel 11 (especially, into its rim 11R) from the outward edge, in the vehicle width direction, of the arm cover 50. Thereby, the disturbance of the vehicle rear airflow is suppressed.

In FIG. 7B which is the bottom-face perspective view showing the airflow of the traveling air flowing below the vehicle floor of the comparative example, the same reference characters as those used in FIG. 7A are used for convenience's shake of describing the example. Further, in FIG. 7A, imaginary lines β1, β2 show shapes of the comparative example (see FIG. 7B). In FIG. 7B, imaginary lines α1, α2 show a shape of the embodiment (see FIG. 7A).

In a case where the arm cover 50 is not provided with the arm-cover enlarged portion 50A like the comparative example shown in FIG. 7B, the traveling air flowing below the vehicle floor which flows along the under cover 50 is sucked out by the vehicle-body side-face airflow having a high flow speed, so that there occurs an airflow which flows upwardly and into the rim 11R of the rear wheel 11 from the outward edge, in the vehicle width direction, of the under cover 50. Meanwhile, according to the embodiment shown in FIG. 7A, it is suppressed by the arm-cover enlarged portion 50A that the traveling air flows upwardly and into the rear wheel 11 from the outward edge, in the vehicle width direction, of the arm cover 50.

As shown in FIG. 5, the arm-cover enlarged portion 50A of the arm cover 50 is configured to protrude (be extended) outwardly, in the vehicle width direction, from the trailing arm outer 43 of the trailing arm 41 in a vehicle-face bottom view.

As shown in FIG. 6, the floor under cover 36 is provided with a floor-under-cover enlarged portion 36A such that a rear end portion 36a of the floor under cover 36 which is positioned in front of the arm cover 50 faces closely to a front edge 50a of the arm-cover enlarged portion 50A of the arm cover 50.

Thus, a gap through which the position below the vehicle floor and the rear wheel house 12 are connected (i.e., the gap formed among the inward edge of the rear wheel tire 11T, the rear end portion 36a of the floor under cover 36, and a front end portion 50a of the arm cover 50) is reduced by the arm-cover enlarged portion 50A of the arm cover 50 and the floor-under-cover enlarged portion 36A of the floor under cover 36 such that the traveling air flowing below the vehicle floor is suppressed from flowing into the rear wheel house 12, thereby suppressing the disturbance of the vehicle rear airflow.

Further, as shown in the bottom-face view of FIG. 6, a rear-end side 36b of the floor under cover 36 and a front-end side 50b of the arm cover 50 are configured to face closely to each other in parallel, and an outward edge 36c, in the vehicle width direction, of the floor-under-cover enlarged portion 36A of the floor under cover 36 and an outward-side edge 36c, in the vehicle width direction, of the arm-cover enlarged portion 50A of the arm cover 50 are configured to go around an inward-side face of a front portion of the tire 11T of the rear wheel 11 in a curved shape, being spaced apart from the rear wheel tire 11T, and be continuous to each other in the vehicle longitudinal direction.

Thus, the traveling air flowing below the vehicle floor which have passed along the lower face of the floor under cover 36 is prevented by cooperation of the floor under cover 36 and the arm cover 50 from flowing upward and into the wheel house 12.

As shown in FIGS. 5 and 6, the arm-cover enlarged portion 50A of the arm cover 50 is configured to protrude toward the rim 11R of the rear wheel 11 beyond an outward-side end portion of the trailing arm outer 43 of the trailing arm 41, and a vertical wall portion 50d which extends upwardly is provided at least at an outward edge, in the vehicle width direction, of the arm-cover enlarged portion 50A of the arm cover 50.

In the present embodiment, as shown in FIG. 5, another vertical wall portion 50e which extends upwardly is provided at an inward edge, in the vehicle width direction, of the arm cover 50 as well. Herein, the arm cover 50 is made of synthetic resin, such as polypropylene, and the above-described vertical wall portions 50d, 50e are integrally formed at a body of the arm cover 50. Thus, the strength of the arm cover 50 is effectively increased by the vertical wall portion 50d even if the arm-cover enlarged portion 50A of the arm cover 50 is configured as a cantilever structure.

In the figures, reference character 60 denotes a rear under cover which attains airflow straightening between a bottom face of the silencer 32 and a bottom face of the rear bumper face 14, reference character 61 denotes a fuel tank, and reference character 62 denotes a heat insulator which is provided between the silencer 32 and the floor panel 18. Further, in the figures, an arrow F shows a vehicle forward side, an arrow R shows a vehicle rearward side, an arrow IN shows an inward side in the vehicle width direction, an arrow OUT shows an outward side in the vehicle width direction, and an arrow UP shows a vehicle upward side.

While a vehicle-left side structure is exemplified as the vehicle-body lower face structure in the above-described embodiment, a vehicle-right side structure is configured to be similar to the vehicle-left side structure.

As described above, the vehicle-body lower face structure of the above-described embodiment comprises the torsion beam type of rear suspension 40 comprising a pair of right-and-left trailing arms 41 and the torsion beam 42 connecting the trailing arms 41, the floor under cover for airflow straightening 36 attached to the portion of the vehicle body in front of the rear suspension 40 so as to cover the vehicle-body lower face, and the plate-shaped arm cover for airflow straightening 50 attached to the lower portion of each of the trailing arms 41 of the rear suspension 40 so as to cover the lower face of the trailing arm 41, wherein the arm cover 50 is provided with the arm-cover enlarged portion 50A which is configured to protrude outwardly, in the vehicle width direction, from the trailing arm 41 in the vehicle bottom-face view, and the floor under cover 36 is provided with the floor-under-cover enlarged portion 36A such that the rear end portion 36a of the floor under cover 36 which is positioned in front of the arm cover 50 faces closely to the front edge 50a of the arm-cover enlarged portion 50A of the arm cover 50 (see FIGS. 2 and 3).

According to this structure, the gap through which the position below the vehicle floor and the inside of the rear wheel house 12 are connected (i.e., the gap formed among the inward edge of the tire of the rear wheel 11, the rear end portion 36a of the floor under cover 36, and the front end portion of the arm cover 50) is so reduced by the enlarged portion 50A of the arm cover 50 and the enlarged portion 36A of the floor under cover 36 that the traveling air flowing below the vehicle floor can be suppressed from flowing into the rear wheel house 12, thereby suppressing the disturbance of the vehicle rear airflow.

Further, since the above-described arm-cover enlarged portion 50A is configured such that the outward-side edge 50c, in the vehicle width direction, thereof is extended into the rim 11R of the rear wheel 11 in the vehicle bottom-face view, suppressing of the traveling air flowing below the vehicle floor from flowing into the rear wheel house 12 by means of the arm-cover enlarged portion 50A can be more effective.

In the embodiment of the present invention, the rear-end side 36b of the floor under cover 36 and the front-end side 50b of the arm cover 50 are configured to face closely to each other in the vehicle longitudinal direction, and the outward edge 36c, in the vehicle width direction, of the floor-under-cover enlarged portion 36A and the outward-side edge 36c, in the vehicle width direction, of the arm-cover enlarged portion 36A are configured to go around the inward-side face of the front portion of the tire 11T of the rear wheel 11 in the curved shape, being spaced apart from the rear wheel tire 11T, and be continuous to each other in the vehicle longitudinal direction (see FIG. 3).

According to this structure, since only the necessary gap exists among the inward edge of the rear wheel tire 11T, the rear end portion 36a of the floor under cover 36, and the front end portion of the arm cover 50, it can be prevented that the airflow passing the floor under cover flows upwardly and into the rear wheel house 12, so that this airflow flowing into the rear wheel house 12 can be suppressed more securely.

In the embodiment of the present invention, the arm-cover enlarged portion 50A is configured as the cantilever structure such that the arm-cover enlarged portion 50A protrudes toward the rim of the rear wheel beyond the outward end portion, in the vehicle width direction, of the trailing arm 41, and the vertical wall portion 50d which extends upwardly is provided at least at the outward-side edge, in the vehicle width direction, of the arm-cover enlarged portion 50A of the arm cover 50 (see FIG. 5).

According to this structure, the strength of the arm cover 50 can be effectively increased by the vertical wall portion 50d even if the arm-cover enlarged portion 50A of the arm cover 50 is configured as the cantilever structure.

The present invention should not be limited to the above-described embodiment and any other modifications or improvements may be applied within the scope of a spirit of the present invention.

What is claimed is:

1. A vehicle-body lower face structure, comprising:
   a torsion beam type of rear suspension comprising a pair of right-and-left trailing arms and a torsion beam connecting the trailing arms;
   a floor under cover for airflow straightening attached to a portion of a vehicle body in front of the rear suspension so as to cover a vehicle-body lower face; and
   a plate-shaped arm cover for airflow straightening attached to a lower portion of each of the trailing arms of the rear suspension so as to cover a lower face of the trailing arm,
   wherein said arm cover is provided with an arm-cover enlarged portion which is configured to protrude outwardly, in a vehicle width direction, from said trailing arm in a vehicle bottom-face view, and said floor under cover is provided with a floor-under-cover enlarged portion such that a rear end portion of the floor under cover which is positioned in front of the arm cover faces closely to a front edge of said arm-cover enlarged portion of the arm cover.

2. The vehicle-body lower face structure of claim 1, wherein a rear-end side of said floor under cover and a front-end side of said arm cover are configured to face closely to each other in a vehicle longitudinal direction, and an outward edge, in the vehicle width direction, of said floor-under-cover enlarged portion and an outward-side edge, in the vehicle width direction, of said arm-cover enlarged portion are configured to go around an inward-side face of a front portion of a tire of a rear wheel in a curved shape, being spaced apart from the rear wheel tire, and be continuous to each other in the vehicle longitudinal direction.

3. The vehicle-body lower face structure of claim 2, wherein said arm-cover enlarged portion is configured such that the outward-side edge, in the vehicle width direction, thereof is extended into a rim of the rear wheel in the vehicle bottom-face view.

4. The vehicle-body lower face structure of claim 3, wherein said arm-cover enlarged portion is configured as a cantilever structure such that the arm-cover enlarged portion protrudes toward the rim of the rear wheel beyond an outward end portion, in the vehicle width direction, of said trailing arm, and a vertical wall portion which extends upwardly is provided at least at the outward-side edge, in the vehicle width direction, of the arm-cover enlarged portion of the arm cover.

5. The vehicle-body lower face structure of claim 1, wherein said arm-cover enlarged portion is configured such that the outward-side edge, in the vehicle width direction, thereof is extended into a rim of the rear wheel in the vehicle bottom-face view.

6. The vehicle-body lower face structure of claim 5, wherein said arm-cover enlarged portion is configured as a cantilever structure such that the arm-cover enlarged portion protrudes toward the rim of the rear wheel beyond an outward end portion, in the vehicle width direction, of said trailing arm, and a vertical wall portion which extends upwardly is provided at least at the outward-side edge, in the vehicle width direction, of the arm-cover enlarged portion of the arm cover.

* * * * *